Feb. 8, 1927.
D. McGONAGLE
1,617,068
CONDUIT CLEANER
Filed Dec. 3, 1925
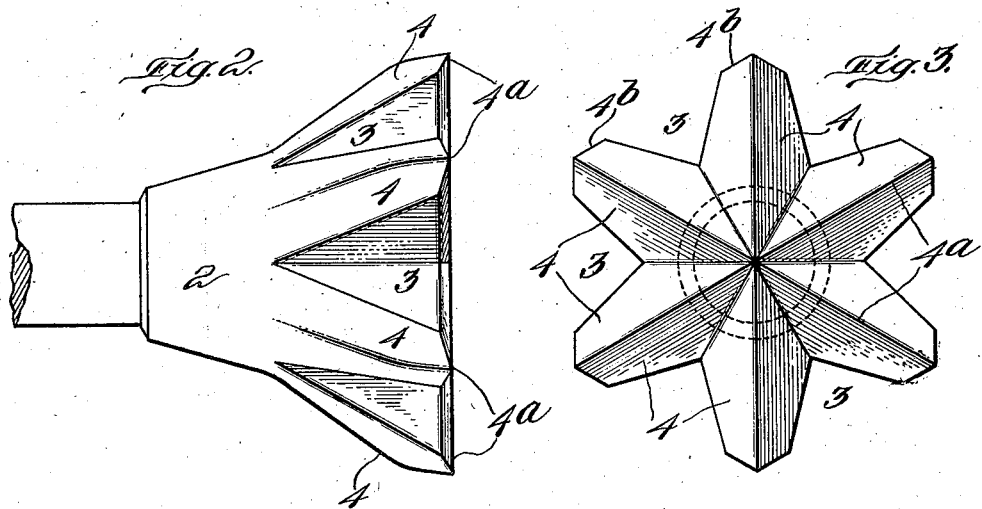
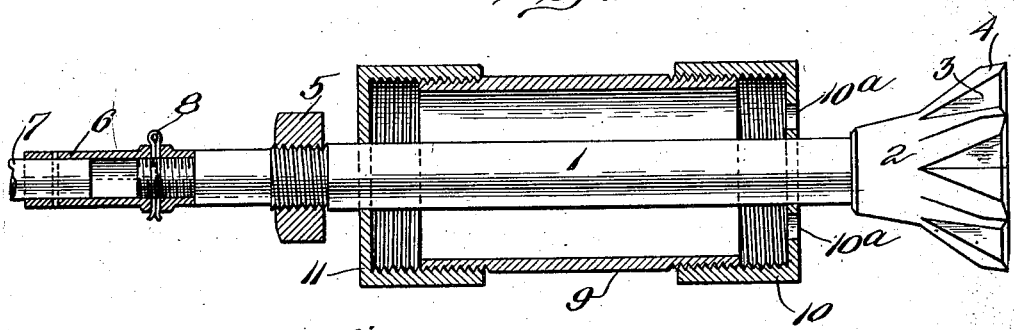
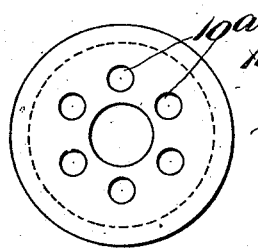
Inventor:
Daniel McGonagle
by
Geo. N. Goddard, Atty.

Patented Feb. 8, 1927.

1,617,068

UNITED STATES PATENT OFFICE.

DANIEL McGONAGLE, OF EVERETT, MASSACHUSETTS.

CONDUIT CLEANER.

Application filed December 3, 1925. Serial No. 73,004.

This invention relates to devices for cleaning out conduits or flues of various kinds, and more particularly underground conduits for electric cables and the like which become clogged with an accumulation of dirt or refuse which must be removed in order to draw through a cable.

As these conduits are often made of fibre or easily ruptured material, the cutting edges are so arranged as to avoid injury to the surrounding wall of the conduit while efficiently cutting away the compacted material which obstructs the passage. Furthermore, the device is so constructed as to provide means for effectively accumulating the loosened dirt and permit its easy withdrawal from the conduit, the cutter head being formed to provide rearward passages for the loosened dirt and being combined with a dirt-collecting receptacle or container by which the loosened dirt is collected and removed from the conduit.

These and other features of the invention will be described in the following specification and will be defined in the claims hereto annexed.

In the accompanying drawings I have illustrated a simple and convenient construction and arrangement embodying the principles of this invention, in which:

Figure 1 is a side elevation with the container shown in cross section.

Figure 2 is an enlarged detail side elevation of the cutter head.

Figure 3 is a front elevation of the cutter head.

Figure 4 is a front end elevation of the dirt-collecting container.

In the practice of this invention, according to the form illustrated, I provide a short cylindrical shank 1, to whose forward end is secured the cutter head 2, which is of flared or approximately frusto conical form and cut through or notched peripherally through its larger diameter to provide longitudinal passage-ways 3 and form cutting teeth 4, whose forward faces are beveled to form approximately radial cutting edges 4$^a$, which project forward to dig into the mass of material accumulated in the conduit as the cutter is advanced through the conduit in the cleaning operation. Preferably the outer ends of the teeth 4 are also beveled, as shown at 4$^b$, so that the cutter, as viewed from in front, has something the appearance of a star-wheel.

Some distance to the rear of the cutter head I provide a stop member which, in this case, is in the form of a nut 5, threaded on the shank and, therefore, forming a stop for the container which may have a slight longitudinal adjustment.

Between the stop member 5 and the head 2 is loosely mounted on the shank a dirt-collecting container which, in the form shown, comprises a cylindrical tube 9 to whose front end is secured, by threaded engagement, a cap 10 centrally perforated to allow the shank 1 to pass freely through it and provided with surrounding perforations 10$^a$, through which the loosened dirt which passes through the notches 3 in the cutter may enter the container.

At its rear end the container has a similar threaded cap 11 without inlet holes, such as 10$^a$, in the forward cap.

To lengthen the shank and form a long flexible handle, I provide a longitudinal shaft or rod 7, preferably of wood because of its flexibility, to whose forward end is pinned or secured a coupling ferrule 6. The coupling ferrule is preferably internally threaded to receive the threaded rear end of the shank 1, and to prevent rotative slip a cotter pin 8 may be inserted through the ferrule and the shank 1.

The actuating rod 7 may be connected to any suitable source of power, such as a pneumatic hammer, to impart a short, rapid reciprocation to the cutter. As the container 9 is loose on the cutter shank it is free to remain at rest while the cutter is hammering away the dirt. The loosened dirt, passing rearwardly through the notches 3, falls against the front face of the cap 10 and sifts through the apertures 10$^a$ into the interior of the container. The stop member 5 will be set at a sufficient distance to give the requisite amount of lost motion or freedom of movement between the cutter head and the container to permit the cutter to eat its way forward in the conduit, while allowing the container to advance with it without necessitating its participation in the reciprocating or hammering movement of the cutter.

It will be observed that not only does the loose cylindrical member on the cutter head shank serve as a receptacle for collecting waste material, but it performs the additional important function of a bearing guide for keeping the cutter head centralized in the conduit or pipe.

What I claim is:

1. A conduit cleaner embracing in its construction a longitudinal shank, an approximately frusto-conical cutting head secured to said shank with its larger end forward, the larger portion of said head being formed with a series of exterior longitudinally extending V-shaped notches to form intermediate cutting teeth, said cutting teeth being provided with radial forwardly exposed cutting edges radiating from a common center, the oblique side faces of said teeth converging toward said peripheral notches to guide the loosened dirt rearwardly through peripheral portions of the cutter head.

2. A conduit cleaner embracing in its construction a shank, an approximately frusto-conical cutter-head secured to the forward end thereof and comprising a plurality of rigid teeth provided with forwardly exposed radial cutting edges peripherally separated by intervening rearwardly extending notches, substantially as described.

3. A conduit cleaner embracing in its construction a shank, a cutter head secured thereto and having cutting teeth and passages for the rearward passage of the dirt loosened by the cutter, and a tubular dirt-collecting container loosely mounted on the shank rearwardly of the cutter, substantially as described.

4. A conduit cleaner embracing in its construction a shank, a star shaped cutter secured to the forward end of the shank and having forwardly exposed cutting edges, a dirt-collecting container loosely mounted on the shank, the shank being provided with a stop member sufficiently to the rear of the container to allow longitudinal play between the cutter and the container when the cutter is reciprocated.

5. A conduit cleaner embracing in its construction a shank, a cutter secured to the forward end thereof, a tubular dirt-collecting receptacle loosely mounted on the shank rearwardly of the cutter to permit limited reciprocation of the cutter independently of the receptacle.

6. A conduit cleaner embracing in its construction a shank, a cutter secured to its forward end, a dirt-collecting receptacle comprising front and rear centrally perforated end heads loosely mounted on the shank, and a connecting tubular member, the front end head being provided with openings for the admission of dirt.

7. A conduit cleaner embracing in its construction a shank, a toothed cutter secured to the forward end thereof, a dirt-collecting receptacle loosely mounted on the shank behind the cutter and having dirt intake openings in its forward end, and an actuating rod detachably coupled to the rear end of the shank.

8. A conduit cleaner embracing in its construction a shank, a toothed cutter secured to the forward end thereof, a dirt-collecting receptacle loosely mounted on the shank rearwardly of the cutter between forwardly and rearwardly disposed spaced stops to permit independent limited reciprocation of the cutter to loosen the dirt in front of it, while causing the receptacle to advance as the cutter works forward in the conduit.

In witness whereof, I have subscribed the above specification.

DANIEL McGONAGLE.